Feb. 18, 1958 W. O. POOR 2,824,302
CATHODE RAY TUBE INDICATOR SYSTEM
Filed Jan. 4, 1954 3 Sheets-Sheet 1

INVENTOR
WILLIAM O. POOR
BY
ATTORNEY

Feb. 18, 1958 W. O. POOR 2,824,302
CATHODE RAY TUBE INDICATOR SYSTEM
Filed Jan. 4, 1954 3 Sheets-Sheet 3

INVENTOR
WILLIAM O. POOR
BY
ATTORNEY

United States Patent Office 2,824,302
Patented Feb. 18, 1958

2,824,302

CATHODE RAY TUBE INDICATOR SYSTEM

William O. Poor, Hempstead, N. Y., assignor to Sperry Rand Corporation, a corporation of Delaware Application January 4, 1954, Serial No. 402,189

5 Claims. (Cl. 343—11)

This invention is concerned with a novel type cathode ray tube presentation. More particularly, the arrangement and combination of apparatus in accordance with the present invention affords a novel visual presentation of a multiplicity of received signals including the simultaneous discrete display of a plurality of diverse spatial displacement information as it pertains to each respective received signal.

In prior art cathode ray tube displays, various types of information with respect to different targets could be displayed such as angle error signals, range information, or displacement of the target with respect to other fixed or known references. However, in order to display a plurality of types of target information with respect to a multiplicity of targets, it was usually necessary to employ several cathode ray tubes, each cathode ray tube being confined to the display of possibly two types of target information and the total synthesis of the various types of target information displayed on the several cathode ray tubes employed in the prior art was left to a mental process performed by the observer.

The object of the present invention is to present on a single cathode ray tube a plurality of types of target information independently and concurrently with respect to each of a multiplicity of targets. The present invention makes it possible, for instance, to display a multiplicity of targets on an isometric or perspective type diagonal sweep so that each target will appear on the face of the cathode ray tube to be proportionately displaced in range from a known or determinable reference related to the initiation of the diagonal cathode ray tube sweep. Individual traverse and elevational angle errors as pertain to each of the multiplicity of targets may be independently displayed in synchronism with the range indication of each target so that all three types of information are simultaneously presented.

These and other features and objects of the invention will be better understood by an understanding of the operation as explained in connection with the following drawings in which:

Fig. 1 is a schematic block diagram of a system embodying the present invention;

Figs. 2a, b, and c are illustrations of the component cathode ray tube patterns which contribute to the composite cathode ray tube presentation, shown in Fig. 2d as it appears to the observer;

Figure 2:
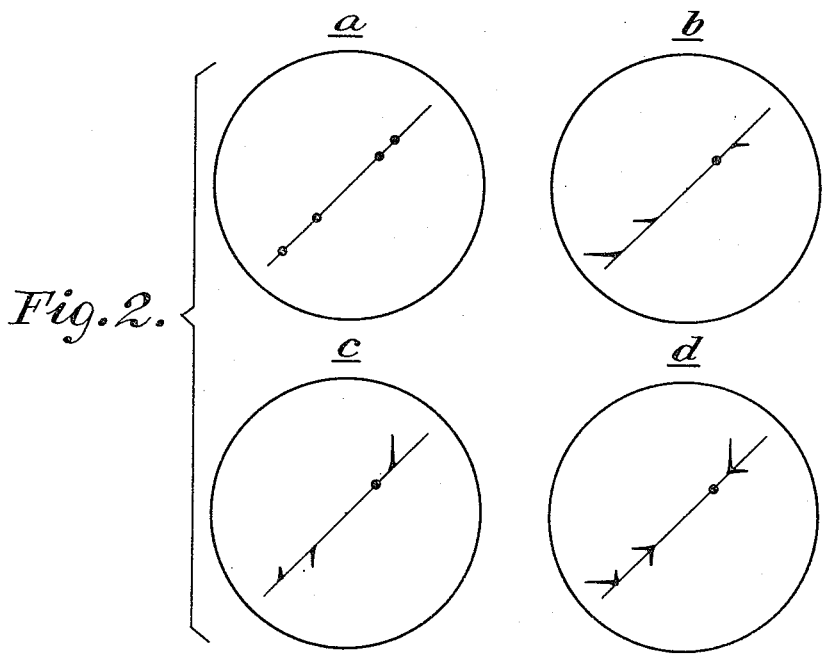

Basically, the present invention is conceived with the object in mind of providing a clear and easily understood simultaneous presentation of several types of target information with respect to a multiplicity of targets. A linear diagonal sweep is employed so as to afford an isometric or quasi-three-dimensional view such as is illustrated by Fig. 2a. The magnitude of displacement along this sweep from the initial point may represent relative range, for instance. By suitable means, the diagonally swept electron beam of the cathode ray tube may be intensified, as illustrated in Fig. 2a, to indicate range displacement of each received signal with respect to a known reference. That reference is, of course, related to the initiation of the diagonal sweep and synchronized thereto.

Alternate diagonal sweeps of the electron beam of the cathode ray tube may be deflected horizontally to the right or the left of the normal linear diagonal sweep in proportion to the amplitude of the respective errors, as shown in Fig. 2b, to indicate, for instance, traverse angle error of the main axis of the system with respect to the source of a received signal which is displaced to the right or left of the main axis of the system. This traverse angle error information, of course, may be displayed with respect to any reasonable number of received signals, each horizontal deflection being removed from the other by an appropriate range displacement in accordance with the corresponding range separations between the sources of received signals.

Similarly, on the remaining alternate sweeps of the electron beam of a cathode ray tube and at points coincident with the respective correlated range indications, the elevation angle errors, for instance, may be displayed by vertical deflection of the electron beam above or below the normal linear diagonal sweep in proportion to the amplitude of the respective errors, as illustrated by Fig. 2c. On a properly chosen cathode ray tube having appropriate persistence characteristics of the luminescent material on its face, the composite of the cathode ray tube displays of Figs. 2a, b, and c will present what appears to be a continuous and simultaneous display as illustrated by Fig. 2d.

Figure 1:
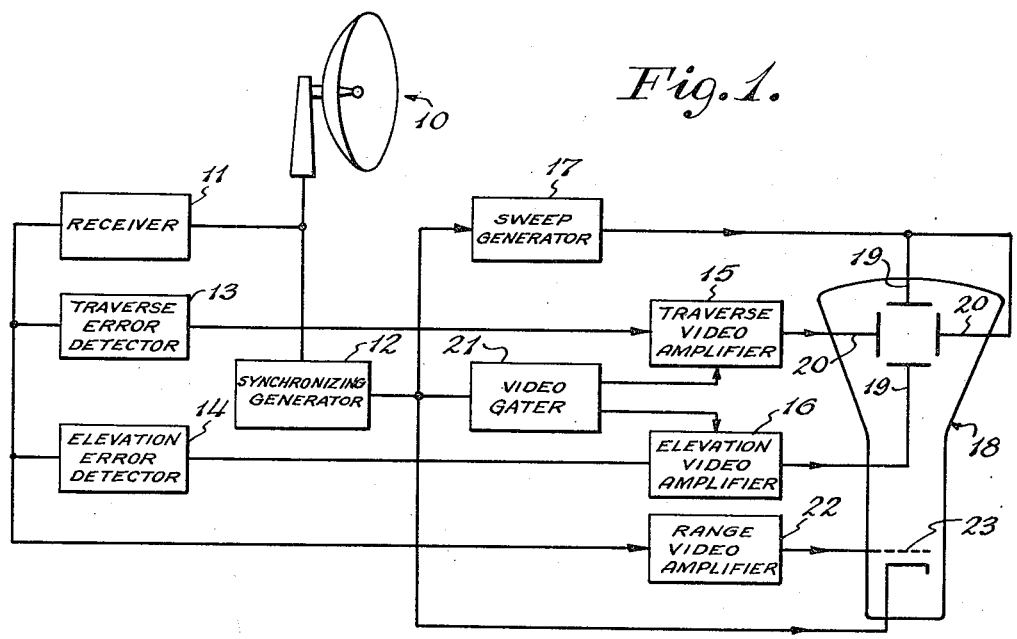

The major apparatus components which are necessary to generate the error signals and effect such a display are illustrated in Fig. 1. The paraboloid reflector 10 of a typical system is shown as being connected to a receiver 11 and a synchronizing generator 12. The synchronizing generator 12 may be driven from a radar transmitter or may be held in synchronization by the reception of appropriate reference intelligence, many of which schemes are known in the radar and radio direction finding art. The receiver 11 of the system is connected respectively to a traverse error detector 13 and an elevation error detector 14. The latter two components are respectively connected to a traverse video amplifier 15 and an elevation video amplifier 16.

The output of the synchronizing generator 12 is connected to a sweep generator 17, which in the case of an electrostatically deflected cathode ray tube 18, such as is illustrated in Fig. 1, may produce a sawtooth type voltage waveform. This sawtooth waveform is impressed simultaneously upon both the vertical and horizontal deflection plates of the cathode ray tube, shown as 19 and 20, respectively, to provide a diagonal sweep of the electron beam across the face of the cathode ray tube. A video gater 21 is arranged to receive the output of the synchronizing generator 12 and produces a substantially rectangular gate in synchronization with the sawtooth waveform output of the sweep generator 17 so that the gate waveform and the sawtooth waveform are synchronous.

The video gater 21 is employed to cut off or blank the output of one video amplifier while permitting the output of the other video amplifier to be impressed upon the deflection means of the cathode ray tube 18 to which it is connected. For instance, while the traverse video amplifier 15 is gated off, the elevation video amplifier 16 output is impressed upon the vertical means 19 of the cathode ray tube 18. Conversely, while the elevation video amplifier 16 is cut off, the output of the traverse video amplifier 15 is impressed upon the horizontal deflection means 20 of the cathode ray tube 18. Alternate blanking or gating of the traverse and elevation error video signal, it may be seen, is accomplished in synchronism with the diagonal sweep of the electron beam.

The receiver 11 is connected to a range video amplifier 22, which in turn has its output applied to the control electrode 23 of the cathode ray tube 18. This latter arrangement affords a means of range indication by intensification of the electron beam, for instance, to indicate the reception of signals as they are related in time displacement from the initiation of the diagonal sweep of the cathode ray tube.

Figure 4:
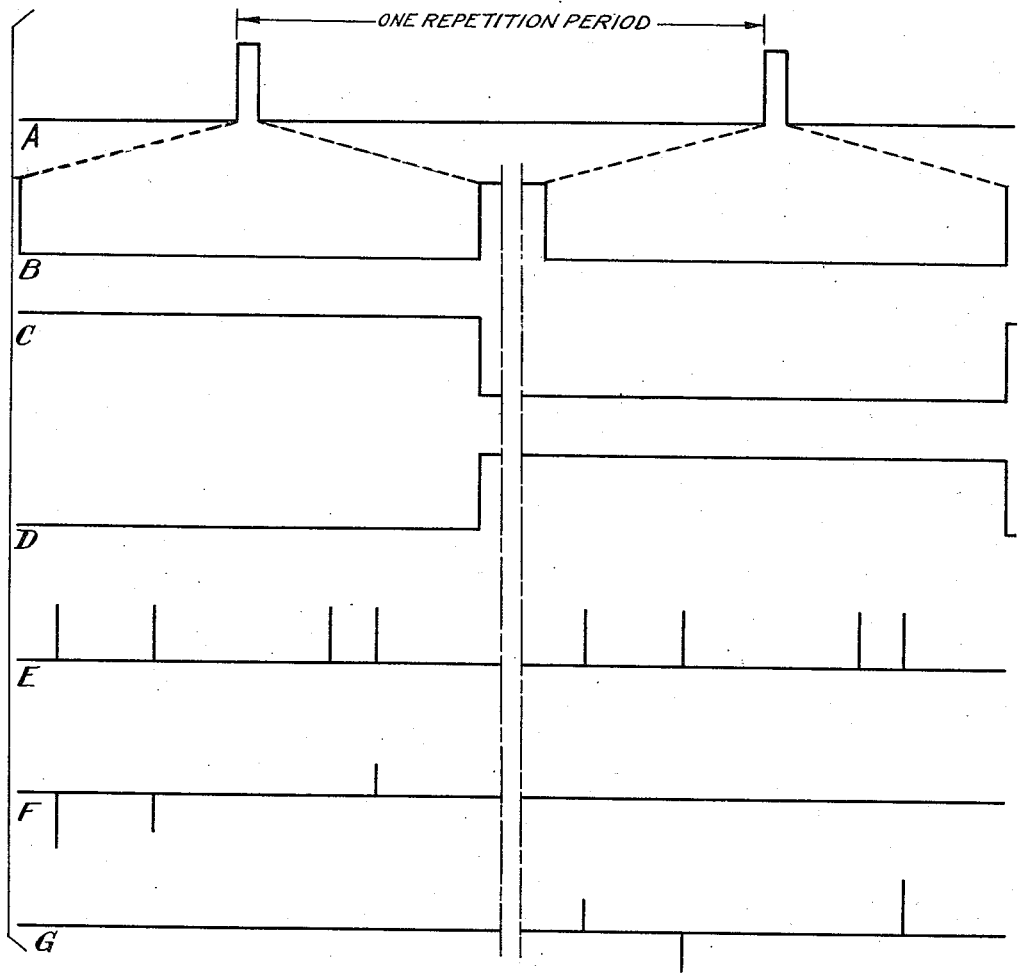
Fig. 4 is an illustration of typical waveforms generated and utilized in accordance with the present invention.

The operation of the invention may be better understood by reference to the waveforms of Fig. 4 which illustrate the several signals which are impressed upon a cathode ray tube to effect the visual presentation of Fig. 2d. The alternate sweep signals of Fig. 4 may best be understood in relation to the visual display caused by each as illustrated in Figs. 2a through 2d.

Waveform A of Fig. 4 illustrates the repetition cycle of a reference pulse or synchronizing intelligence. In some cases, such as where transmitting and receiving radar are employed, the reference pulse may be the transmitted pulse or a signal derived therefrom. In other instances where signals are not transmitted but only received, the reference signal may be received and translated to a reference pulse of a cyclic type having a substantially constant repetition rate though this latter characteristic need not necessarily be so. In either case, the synchronization pulse illustrated in waveform A is used to trigger the synchronizing generator 12 of Fig. 1. Within the synchronizing gate, the signal intelligence is received and the remaining waveforms B through G of Fig. 4 illustrate on an expanded time scale the various signals generated concurrently within the synchronizing gate. It will be noted that waveform B is an inverted version of waveform A. Thus, it may be seen that the over-all time relationship of waveform A prevails for waveforms B through G, but that the greater portion of the insignificant time lapse between the synchronizing gates and the received signal intelligence is eliminated from waveforms B through G, inclusive, as is indicated by the discontinuity between the broken lines.

Waveform C illustrates one of the gates produced by the video gater of Fig. 1. It may be assumed for the purpose of illustration that the gate of waveform C is applied to the traverse video amplifier 15 of Fig. 1. Waveform D illustrates the converse or oppositely phased gate waveform applied to the other video amplifier, namely the elevation video amplifier 16. Waveform E illustrates the video information as received by the video amplifier 22 from the receiver 11 and thence is impressed upon the control grid of a cathode ray tube to effectuate the visual indications which may signify range, for instance, as illustrated by Fig. 2a.

Waveform F illustrates the signals which are impressed upon the horizontal plates of the cathode ray tube and it will be noted that these are in proportion to the traverse error with respect to a number of targets and effect the visual presentation of Fig. 2b. It should be noted that the second portion of the illustrated waveform F impresses no signals upon the horizontal deflection plates of the cathode ray tube because the traverse video amplifier is blanked during that period by the negative-going gate of waveform C. Waveform G illustrates the signals which are proportional to the respective elevational errors of each target and are impressed on the vertical deflection plates of the cathode ray tubes to effectuate the visual presentation of Fig. 2c. In a manner opposite to the operation of blanking waveform C, it should be noted that waveform D blanks the first portion of waveform G by holding the elevation video amplifier output cut off during the first portion of waveform G.

Thus, it may be seen by the cooperative integration and synchronization of the respective waveforms, the composite cathode ray tube display of Fig. 2d is synthesized. The luminiscent persistence of the face of the cathode ray tube, together with the nature of human vision, contribute to effecting a visual display which appears to be wholly continuous and simultaneous with respect to both the multiplicity of targets displayed and the several types of correlated target information pertaining to each target.

Figure 3:
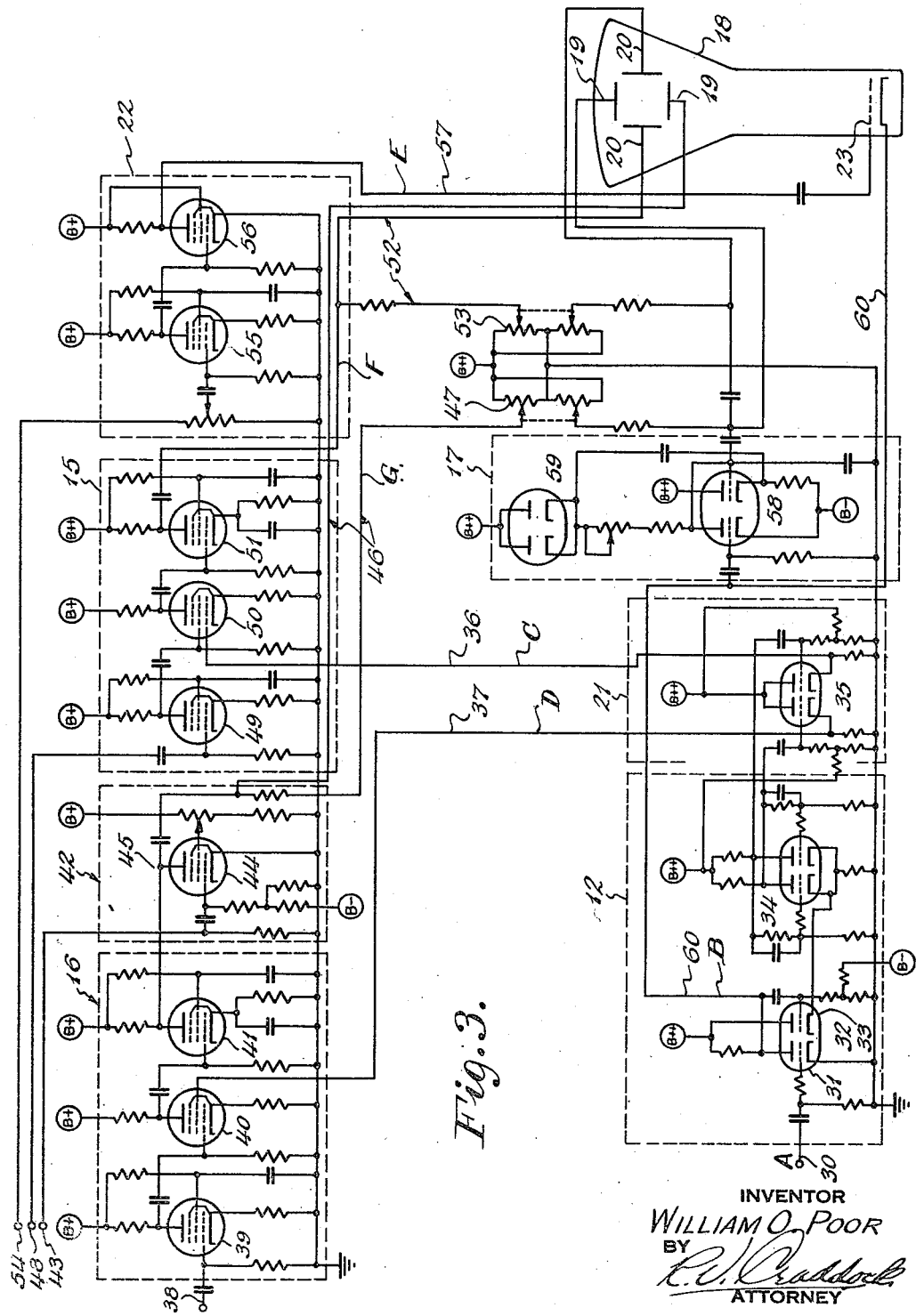
Fig. 3 is a detailed wiring diagram of a preferred embodiment of the present invention.

The embodiment shown in Fig. 3 is comprised of substantially the same major components as those portions of Fig. 1 which are directly concerned with generating the cathode ray tube display. For convenient reference analogous components of Figs. 1 and 3 bear the same numerals. Assuming that appropriate input signals are available, the following explanation of the operation of this particular embodiment will facilitate understanding of the present invention.

At the lower left hand portion of Fig. 3, it will be seen that the synchronizing generator 12 receives the synchronizing intelligence at its input terminal 30 in a manner similar to that shown in Fig. 1. This input, it will be recalled, may be either a synchronizing waveform derived from a received synchronizing signal or it may be a synchronizing waveform related to a transmitted signal and derived therefrom.

The synchronizing generator 12 as shown in Fig. 3 comprises an inverter 31 which is the left hand portion of a 12AT7 vacuum tube 32, a cathode follower 33 which is the right hand portion of the same tube 32, and an Eccles-Jordan trigger circuit 34 which may also be a 12AT7. Each of the positive pulse signals of waveform A as illustrated in Fig. 4 are inverted by tube 31 and supplied through an R–C circuit to the grid of cathode follower 33 as a differentiated voltage having negative and positive going portions whose leading edges coincide in time with the leading and trailing edges, respectively, of a positive pulse of waveform A. The negative portion of the aforementioned differentiated voltage has no effect on cathode follower 33 as it is ordinarily held cut-off by a negative B-source of bias voltage connected to its grid as illustrated in Fig. 3. The positive portion of the aforementioned differentiated voltage causes cathode follower 33 to become conductive so that a positive trigger voltage is in effect, developed at the cathodes of the tubes of Eccles-Jordan trigger circuit 34. The trigger circuit 34 produces two oppositely phased rectangular waveforms which are fed to the video gater 21, a dual cathode follower included within the single envelope of vacuum tube 35, of the 12AT7 type. The video gater 21, it will be recalled from the explanation of the operation of Fig. 1, is employed to gate both the traverse video amplifier 15 and the elevation video amplifier 16. Thus separate connections are made from the two cathode follower sections of video gater 21 to respective stages within the traverse and elevation video amplifiers, 15 and 16, as shown by leads 36 and 37. These connections together with the oppositely phased rectangular gate outputs of the Eccles-Jordan trigger circuit 34, cause the traverse video amplifier to be gated off when the elevation video amplifier is gated on and vice versa. The time relationship of these and other signals of the system may be seen by reference to Fig. 4.

The elevation video signal is received into the elevation video amplifier 16 through input terminal 38 and is impressed upon the control electrode of a vacuum tube amplifier 39 which may be of the 6AK5 type. A second stage of amplification follows, which also may consist of an electron tube 39 of the 6AK5 type. This latter stage receives both the plate output of the preceding stage connected to its grid and the rectangular waveform gate output of the video gater 21 connected through lead 37 to that electrode of the tube 39 which might normally be used as a screen grid. In this manner the output of the elevation video amplifier 16 is dependent not only upon the signal received at input terminal 38 but also upon the gating action achieved through the latter mentioned connection 37 with the video gater 21. The output of the electron tube 40 is connected to a third stage of amplification 41 which may also be an amplifier of the 6AK5 type.

In the particular embodiment shown in Fig. 3, an additional component, called a narrow gate inserter 42, is provided to vertically deflect the diagonally swept cathode ray tube presentation so that at the center (or some known and fixed reference point) a pedestal shaped gate is produced in the visual presentation. This is illustrated at 61 in Fig. 5.

The narrow gate signal is received on lead 43 and impressed upon the control electrode of electron tube 44, which may be of 6AK5 type. The plates of the output stage 41 of the elevation video amplifier 16 and the narrow gate inserter 42 are commonly connected at 45 so that together they effect an additive signal to control the vertical deflection of the cathode ray tube 18. This composite output is fed through leads 46 to a conventional vertical centering control 47 and the vertical deflection plates 19 of the cathode ray tube 18.

The traverse video signal is received at least 48 and impressed upon the input stage 49 of the traverse video amplifier 15. This latter component of the apparatus comprises amplification stages including two 6AK5 electron tubes 49 and 50 and one 6AQ5 51 arranged in a manner similar to the elevation video amplifier already described. The output of the traverse video amplifier 15 is connected through leads 52 to a conventional horizontal centering control 53 and the horizontal deflection plates 20 of cathode ray tube 18.

The range video amplifier 22 receives the range video signal over lead 54 and amplifies the signal through two stages 55 and 56 which may be 6AH6 electron tubes. The output of the range video amplifier 22 is impressed upon the control electrode 23 of cathode ray tube 18 through lead 57 and thus modulates the intensification of the electron beam which strikes the face of the cathode ray tube 18 to form the visual display thereon.

The received synchronization signal in inverted form is connected from the plate of the inverter 31 to the input of the sweep generator circuit 17, which in the embodiment illustrated in Fig. 3 is a boot-strap type of linear sawtooth sweep generator. The sweep generating circuit 17 is thus actuated in response to the synchronizing input signal. The boot-strap sweep circuit may be comprised of a dual triode 12AU7 type electron tube 58 and dual diode 6AL5 tube 59, arranged and connected to operate in a conventional manner. The output waveform of the boot-strap sweep generating circuit 17 is connected to both the vertical deflection plates 19 and the horizontal deflection plates 20 of the cathode ray tube 18 to effect linear diagonal sweeping of the cathode ray beam.

A connection 60, from the inverter 31 of the synchronizing generator 12, is made to the cathode of the cathode ray tube 18 to sensitize the tube during the sweep time thereof and provide blanking during the fly-back of the electron beam.

Thus, it may be seen that in its operation, the embodiment of the present invention as disclosed in Fig. 3 synchronously generates oppositely phased gating waveforms and a sawtooth waveform in response to received synchronizing intelligence. The range video amplifier, traverse video amplifier, and elevation video amplifier receive respective correlated error signals pertaining to a plurality of targets displaced in time by an amount proportioned to range, and after amplification impress output signals upon the control electrode, the horizontal deflection plates, and the vertical deflection plates, respectively, of cathode ray tube 18 so that the resulting visual presentation is an integrated and synchronized composite, the elevation and traverse error signals being traced on alternate sweeps but appearing to be continuous and simultaneous because of the time lag of the cathode ray tube luminescent material and the persistence of vision.

Figure 5:
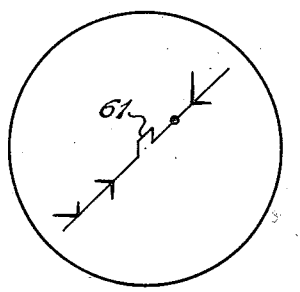
Fig. 5 is a cathode ray tube presentation afforded in accordance with a modification of the present invention.

In addition to target error signals, the elevation video amplifier receives a narrow gate signal in this particular embodiment which affords the pedestal of vertical deflection as shown at 61 in Fig. 5. With properly timed and synchronous gates, the apparatus as disclosed thus provides:

Firstly, a means of generating a synchronized diagonal sweep,

Secondly, intensification of the electron beam to designate targets displaced on the diagonal sweep in proportion to a known range reference, Thirdly, horizontal deflection on alternate diagonal sweeps to designate traverse errors, the magnitude of each discrete horizontal deflection corresponding to the angular displacement in traverse of a target, and Fourthly, vertical deflection on the remaining alternate diagonal sweeps to designate elevation errors, the magnitude of each discrete vertical deflection corresponding to the elevational angular displacement of each respective target.

As has already been described, a narrow gate pedestal may be inserted upon the vertical deflection if desired.

Of course, other types of reference having fixed or variable character may be employed such as a reticle, for instance, either etched, inscribed or electronically traced by means of the electron beam of the cathode ray tube 18 through use of appropriate control means.

It may be appreciated from an understanding of the present invention that a very readily understandable composite picture is displayed on the face of the cathode ray tube embracing a plurality of targets and several types of information pertaining to each target. Referring to Fig. 5, the first target displayed at the lower left, for instance, shows that the main axis of the system is both to the left and up with respect to that target, each angular error being displayed in a proportional magnitude. It is readily discerned that the angular error with respect to the second target is both to the left and below. The third target is displayed by an intensification only of the cathode ray tube electron beam and this reveals that the axis of the radar system is directed at that particular target without error. The fourth target displayed shows by its correlated error signals that the axis of the system has been directed to a spatial disposition both to the right and above the target.

One of the more apparent and most desirable advantages of the present system is that it affords a display which has the facility of easy and logical interpretation, particularly in that aspect by which the combined error signals form a right angle which may be considered as an arrowhead. The polarity of signals which effect the display may be arranged so that the arrowhead formed by the errors correlated to any one of a plurality of targets points in the direction in which the axis of the system should be reoriented in order to bring it directly upon that particular target. This feature is particularly useful in training new operators in the recognition and use of the visual information displayed.

The present invention may be used in a tracking radar system which receives radiant energy transmitted from a target source such as a guided missile. It may be employed equally well with a dual radar system in which it receives its synchronizing signal from an acqusition radar and performs only tracking functions or in other known arrangements of radar or object detection systems wherein the appropriate error and synchronizing signals are available together with range information or similar intelligence.

Appropriate angular error signals with respect to a plurality of targets may be secured by a multiplicity of radars utilizing separate channels, or by use of a monopulse radar of the general type such as is disclosed in the copending patent application Serial No. 201,780, filed on December 20, 1950, and assigned to the assignee of the present invention. A lobe switching radar such as disclosed in copending application Serial No. 509,061, assigned to the assignee herein, and now U. S. Patent No. 2,716,235, issued August 23, 1955, may also be employed in an appropriate multiple arrangement to supply angular displacement signals with respect to a plurality of targets.

The present invention normally utilizes signals derived from a tracking type of radar but may be used in conjunction with other types of radar such as those disclosed in applications Serial No. 413,986 and Serial No. 409,498, both filed on February 10, 1954, in the names of W. G. Steber and S. Sproul, respectively, and both entitled Radar Indicating System, also assigned to the assignee herein. In such a combination the acquisition radar described in the above-named applications is used primarily to acquire the target or targets which it is desired to track. Then the tracking radar assumes its functions with respect to targets so acquired and furnishes signals appropriate to effecting the visual display afforded in accordance with the present invention. It may be appreciated that if the acquisition radar has the same pulse repetition rate as the tracking radar the synchronizing signal used in the indicator system in accordance with the present invention may be taken from the acquisition radar. If different pulse repetition rates are employed in the two types of radar, the indicator system may take its synchronizing signal from the tracking radar or the range information of the acquisition radar may be converted so as to be compatible with the tracking radar pulse repetition rate and range intelligence. Obviously, many such combined and co-operative arrangements are possible in accordance with the teaching and spirit of the present invention.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an object locating system including receiving means, said means being directionally sensitive to produce signals respectively dependent upon the displacement in elevation and traverse of the source of each received signal with respect to a reference axis of said receiving means; an indicating apparatus comprising, a cathode ray tube assembly having means for deflecting the electron beam of said tube in first and second degrees of freedom, respectively, sweep generator means coupled to said last-named means for supplying a sweep voltage thereto, means coupled to said sweep generator means for recurrently actuating said sweep generator at known time intervals, means responsive to said received signals for indicating on said cathode ray tube the respective time of reception of each said received signals relative to said known timed deflection, means coupled to said deflecting means of said cathode ray tube assembly for response during alternate sweeps to deflect said electron beam in a direction and for a magnitude corresponding to each said elevational displacement signal in synchronism with the respective indication of each received signal, means responsive during the remaining alternate sweeps of said generator means to deflect said electron beam in a direction and for a magnitude corresponding to each said traverse displacement signal in synchronism with the respective indication of each said received signal, whereby the spatial disposition of the source of each received signal in elevation and traverse with respect to said reference axis are independenly and simultaneously displayed on said cathode ray tube.

2. In an object locating system including receiving means, said means being directionally sensitive to produce signals respectively dependent upon the displacement in elevation and traverse of the source of each received signal with respect to a reference axis of said receiving means; an indicating apparatus comprising, a cathode ray tube assembly having vertical and horizontal deflection means, sawtooth wave generator means connected to said deflection means to provide diagonal deflection of the electron beam of said tube, means coupled to said generator means for recurrent actuation thereof at known time intervals, means coupled to said cathode ray tube assembly for response to said received signals for indicating on said cathode ray tube the respective time of reception of each said received signal relative to said known time intervals, means coupled to said vertical deflection means and responsive during alternate diagonal sweeps of said electron beam for impressing each said elevational displacement signal on said vertical deflection means coincident with the respective indication of each received signal, means coupled to said horizontal deflection means and responsive during the remaining alternate diagonal sweeps of said electron beam for impressing each said traverse displacement signal on said horizontal deflection means coincident with the respective indication of each said received signal, whereby the time displacement of each received signal relative to a known reference, and the spatial disposition of the source of each received signal in elevation and traverse with respect to said reference axis are independently and simultaneously displayed on said cathode ray tube.

3. In an object locating system including directionally sensitive means for receiving signals, and means for detecting the displacement in elevation and traverse of the source of each of said received signals with respect to a known reference and producing independent signals respectively proportional thereto; an indicating apparatus comprising, a cathode ray tube having vertical and horizontal deflection plates, a sawtooth voltage generator connected to both said deflection plates to sweep the electron beam of said tube diagonally across its face, means coupled to said generator for initiating said diagonal sweep in determinable relation to a known time reference, said cathode ray tube including electron beam intensity control means connected to respond to said received signals for indicating the respective time of reception of each said received signal relative to said time reference, means coupled to said vertical deflection plates and operative during alternate sweeps of said electron beam for impressing each said elevational displacement signal on said vertical deflection plates in synchronism with its corresponding beam intensification signal, means coupled to said horizontal deflection plates and operative during the remaining sweeps of said electron beam for impressing each said traverse displacement signal on said horizontal deflection plates in synchronism with its corresponding beam intensification signal, whereby the time displacement of each received signal relative to said known time reference, and the spatial disposition of the source of each received signal in elevation and traverse are independently and simultaneously displayed on said cathode ray tube.

4. In an object locating system including means for transmitting pulses of radiant energy, directionally sensitive means for receiving reflected signals, and means for detecting the elevational and traverse displacement of each reflective object with respect to a known system axis and producing independent signals respectively proportional thereto; an indicating apparatus comprising, a cathode ray tube having vertical and horizontal deflection means, a sawtooth wave generator connected to both said deflection means to sweep the electron beam of said tube diagonally across its face, means coupled to said generator for recurrently initiating said diagonal sweep in synchronism with said transmitted signals, means provided with said cathode ray tube for indicating reception of each said reflected signal relative to its time of transmission, means coupled to said vertical deflection means and operative during alternate sweeps of said electron beam to impress each said elevational signal on said vertical deflection means in synchronism with the time referenced indication of the signal to which it corresponds, means coupled to said horizontal deflection means and operative during the remaining alternate sweeps of said electron beam to impress each said traverse signal on said horizontal deflection means in synchronism with the time referenced indication to which it corresponds, whereby the relative range, elevational error, and traverse error of each said reflective object relative to said system axis are independently and simultaneously displayed.

5. A cathode ray tube assembly, comprising a cathode ray tube including a cathode for producing an electron beam for direction along a path within said tube, first and second beam deflecting means along said path for directing first and second beam deflecting forces traverse said path in first and second substantially orthogonal directions, respectively, sweep generator means having an output for providing a recurrent sawtooth voltage of predetermined frequency, said output of said last-named means being coupled to said deflecting means for recurrently deflecting said electron beam along a sweep line traverse the path of said electron beam, first and second means coupled to said first and second deflecting means, respectively, for supplying first and second error voltages to said first and second deflecting means, respectively, and means coupled to said first and second error voltage means for supply of said first error voltage to said first deflecting means only during alternate cycles of said sawtooth voltage and for supply of said second error voltage to said second deflecting means only during the remaining alternate cycles of said sawtooth voltage.

References Cited in the file of this patent

UNITED STATES PATENTS

| | | |
|---|---|---|
| 2,412,703 | Wolff | Dec. 17, 1946 |
| 2,541,030 | Busignies | Feb. 13, 1951 |
| 2,648,061 | Parker | Aug. 4, 1953 |